(12) United States Patent
Giallorenzi et al.

(10) Patent No.: US 7,633,995 B1
(45) Date of Patent: Dec. 15, 2009

(54) SYSTEM AND METHOD FOR RECEIVING SPREAD SPECTRUM ENCODED BURSTS USING A COMMON SPREADING CODE

(75) Inventors: Thomas R. Giallorenzi, Herriman, UT (US); Johnny M. Harris, Centerville, UT (US); Dan M. Griffin, Bountiful, UT (US); Richard Ertel, Sandy, UT (US); Eric K. Hall, Sandy, UT (US)

(73) Assignee: L-3 Communications, Corp., New York, NY (US)

( * ) Notice: Subject to any disclaimer, the term of this patent is extended or adjusted under 35 U.S.C. 154(b) by 558 days.

(21) Appl. No.: 11/351,608

(22) Filed: Feb. 10, 2006

(51) Int. Cl.
*H04B 1/00* (2006.01)

(52) U.S. Cl. .................. 375/148; 375/141; 375/140; 375/130; 375/343; 375/340; 375/316

(58) Field of Classification Search .......... 375/148, 375/141, 140, 130, 343, 340, 316
See application file for complete search history.

(56) References Cited

U.S. PATENT DOCUMENTS

| | | | |
|---|---|---|---|
| 4,621,365 A | 11/1986 | Chiu | |
| 5,003,552 A | 3/1991 | Mower | |
| 5,285,472 A | 2/1994 | Leonard et al. | |
| 5,537,397 A * | 7/1996 | Abramson | 370/441 |
| 5,566,202 A | 10/1996 | Lang | |
| 5,774,494 A | 6/1998 | Sawahashi et al. | |
| 6,111,911 A | 8/2000 | Sanderford, Jr. et al. | |
| 6,134,286 A | 10/2000 | Chennakeshu et al. | |
| 6,151,353 A | 11/2000 | Harrison et al. | |
| 6,169,731 B1 | 1/2001 | Stewart et al. | |
| 6,249,539 B1 | 6/2001 | Harms et al. | |
| 6,282,232 B1 | 8/2001 | Fleming, III et al. | |
| 6,323,805 B1 | 11/2001 | Zou et al. | |
| 6,324,227 B1 | 11/2001 | Kang et al. | |
| 6,396,819 B1 | 5/2002 | Fletter et al. | |
| 6,407,699 B1 | 6/2002 | Yang | |
| 6,452,961 B1 * | 9/2002 | Van Wechel | 375/142 |
| 6,480,523 B1 * | 11/2002 | Kondo | 375/140 |
| 6,625,197 B1 * | 9/2003 | Lundby et al. | 375/130 |
| 6,697,441 B1 * | 2/2004 | Bottomley et al. | 375/340 |
| 2003/0235238 A1 * | 12/2003 | Schelm et al. | 375/148 |
| 2004/0247019 A1 * | 12/2004 | McDonough et al. | 375/148 |

* cited by examiner

*Primary Examiner*—David C Payne
*Assistant Examiner*—Zewdu Kassa
(74) *Attorney, Agent, or Firm*—Kirton & McConkie; William T. Ralston

(57) ABSTRACT

A technique for receiving multiple spread spectrum bursts is disclosed. Each spread spectrum burst is encoded with a common spreading code and may include an individual message and unique signal parameters. The technique includes the detection of the spread spectrum encoded bursts and estimation of the reception signal parameters. A single one of a plurality of burst receivers is assigned to each detected burst to extract the individual message of the detected burst.

46 Claims, 6 Drawing Sheets

SYSTEM AND METHOD FOR RECEIVING SPREAD SPECTRUM ENCODED BURSTS USING A COMMON SPREADING CODE

FIELD OF THE INVENTION

The present invention relates generally to the transmission and reception of data in spread spectrum systems, and more particularly to reception of spread spectrum encoded bursts using a common spreading code.

BACKGROUND

Spread spectrum techniques have proven useful in a variety of communications applications, including cellular telephones, wireless local area networks, and military communications. One advantage of spread spectrum techniques is the ability to build a transmitter which is difficult for an unauthorized user to detect.

Wireless spread spectrum systems use a relatively large amount of spectrum bandwidth to communicate their signals. The large bandwidth is consumed by spread spectrum encoding the message data using a spreading code. The two most common types of spread spectrum encoding are frequency hopping, where a pseudonoise spreading code is used to pseudo randomly change the transmission frequency on a periodic basis, and direct sequence, where the pseudonoise spreading code is used to modulate the transmit signal at a high rate relative to the underlying message data.

In order to detect a spread spectrum transmission, it is generally necessary to know the spreading code beforehand. Furthermore, to extract the message data, it is generally necessary to know the timing of the spreading code. For example, in a direct sequence system, this can be accomplished by knowing the code frequency (rate at which the spreading code advances through its sequence) and the starting time of the spreading code sequence (sometimes referred to as the phase of the code). A signal for which the spread spectrum receiver knows the spreading code, spreading code phase, and spreading code frequency can be referred to as a synchronized signal.

One interesting property of spread spectrum systems is that unsynchronized signals appear as noise to a spread spectrum receiver, and are suppressed by the receiver. This property is sometimes used to provide a so-called spread spectrum multiple access system (also known as code division multiple access). For example, different users can be assigned different spreading codes, in which case a receiver will reject signals from users other than the specific user to whose code the receiver is synchronized. As another example, all users can be assigned a common spreading code, but each user transmits with a different spreading code start time. This results in each user having a different spreading code phase. A receiver tuned to the common spreading code at a particular timing (phase) will reject other users with different code timing (phase). This latter example is sometimes referred to as spread aloha. Spread aloha is particularly advantageous when relatively short messages are to be transmitted from a large number of transmitter units.

Spread aloha can allow a simpler receiver than other forms of code division multiple access, since one common spreading code is used. A spread aloha receiver can search for multiple transmissions using a single correlator to correlate received signals against the common spreading code. Achieving synchronization to the spread aloha signal can, however, still be challenging. For example, generally higher signal to noise ratio is obtained the longer the correlation is performed. Higher signal to noise ratio is desirable because it usually provides a higher detection probability for a given false detection (false alarm) rate. To permit long correlation at the receiver typically requires the transmission of a long preamble. These long preambles reduce the communications efficiency of a spread aloha system. Long preambles also increase the possibility that transmissions from two different transmitters will overlap in time, making reception of both transmissions more difficult.

Additional challenges also exist in synchronizing to a spread aloha. For example, synchronization is typically achieved by comparing the output of the correlator to a detection threshold to determine when a signal is present. Setting this threshold properly can be a challenge. If the threshold is set too high, the probability of detecting a transmission is reduced, as weakly received transmissions may fail to provide a high enough correlator output to exceed the threshold. On the other hand, if the threshold is set too low, there may be false detections where noise causes the correlator output to exceed the threshold even though no transmission is present. If inadequate signal to noise ratio is present at the output of the correlator under desired operating conditions, it can prove difficult or even impossible to set a threshold that provides a desired detection probability and acceptable false detection rate. False detections can be particularly troublesome when they result in the receiver committing to demodulating a message, thus blinding it to additional incoming transmissions.

SUMMARY OF THE INVENTION

It has been recognized that it would be advantageous to develop a method and apparatus for receiving multiple spread spectrum bursts encoded with a common spreading code, where each spread spectrum burst may have an individual message and a unique reception signal parameters.

An apparatus for receiving multiple spread spectrum bursts includes a searcher which detects the presence of spread spectrum bursts that have been encoded with the common spreading code. The searcher forms an estimated signal parameter set corresponding to each detected spread spectrum burst. The apparatus also includes a plurality of burst receivers. Each burst receiver is configured to independently demodulate a single spread spectrum burst using the common spreading code and the estimated signal parameter set corresponding to the single spread spectrum burst provided by the searcher. The searcher assigns a single burst receiver to each detected spread spectrum burst.

Additional features and advantages of the invention will be apparent from the detailed description which follows, taken in conjunction with the accompanying drawings, which together illustrate, by way of example, features of the invention.

DETAILED DESCRIPTION

Figure 1:
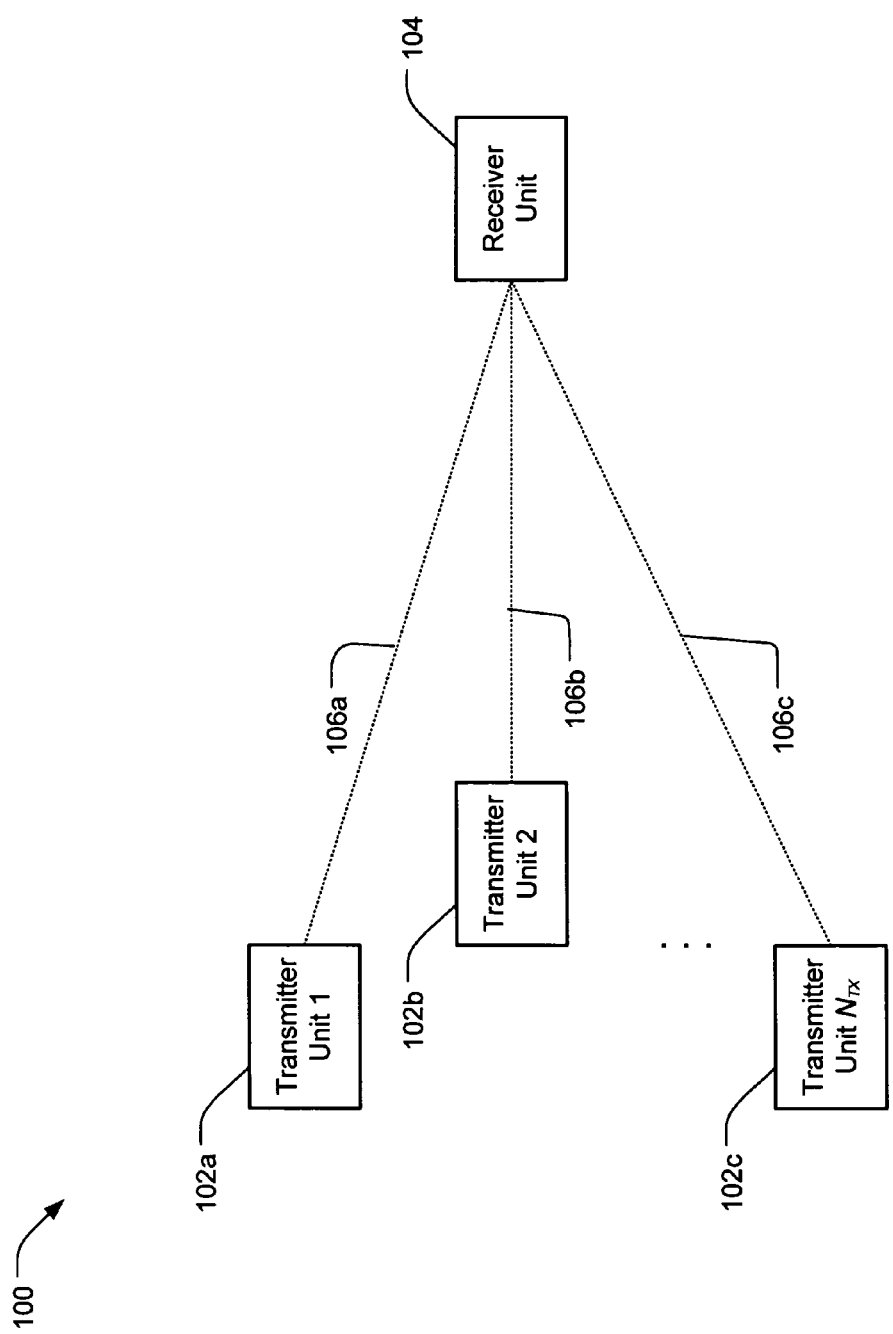
FIG. 1 is a block diagram of a system of communication using a common spreading code in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system of communication using a common spreading code is illustrated in FIG. 1 in accordance with an embodiment of the present invention. The system, shown generally at 100, includes a plurality of transmitter units 102 which each independently transmits a unit-unique message. The unit-unique messages are spread spectrum encoded with the common spreading code. For example, encoding may be performed using direct sequence spread spectrum or frequency hopped spread spectrum. The number of transmitter units is denoted by $N_{TX}$.

For example, transmitter units 102 may be attached to sensors (not shown) and configured to transmit data when a particular condition is sensed. The unit-unique message may thus include information identifying the particular transmitter unit making the transmission, as well as the condition sensed. Unit-unique messages may be received by one or more receiver units 104 over a communication path 106.

Unit-unique messages can be transmitted by the transmitter units 102 at different times, and may even be overlapping. More specifically, the unit-unique message may be spread spectrum encoded with the common spreading code, and each of the transmitter units uses a different starting time of the common spreading code. By common spreading code is meant that the same spreading code is used in common by multiple transmitter units in the system. For example, a predetermined pseudonoise code may be provided to each of the transmitter units. Alternately, several different pseudonoise codes may be provided to each of the transmitters, and the particular pseudonoise code used changed periodically, according to a predefined schedule. As yet another alternative, different pseudonoise codes may be assigned to groups of transmitter units intended to communicate with a single receiver unit. Many different pseudonoise codes are suitable for use in embodiments of the present invention, including but not limited to Walsh codes, scrambled Walsh codes, reordered Walsh codes, Barker codes, Gold codes, Kasami codes, and composite codes formed by combining two or more codes.

Each transmitter unit 102 may encode its transmission using the common spreading code starting from a common position within the common spreading code sequence. Because each unit starts from the same common position, but at a different time, this results in each unit having a different code phase. This transmission scheme using the common spreading code with different start times (or phases) for each transmitter unit is sometimes referred to as spread aloha communication. Spread aloha allows the receiver unit 104 to detect the separate unit-unique message transmissions, even though they may be partially overlapping. Equivalent results may be obtained by having transmitter units randomly select the starting position within the common spreading code sequence. In general, an approach which results in transmitter units having unique signal parameters, where the signal parameters include code phase and transmit frequency, can be accommodated by the receiver unit as will become apparent from the discussion below.

Figure 2:
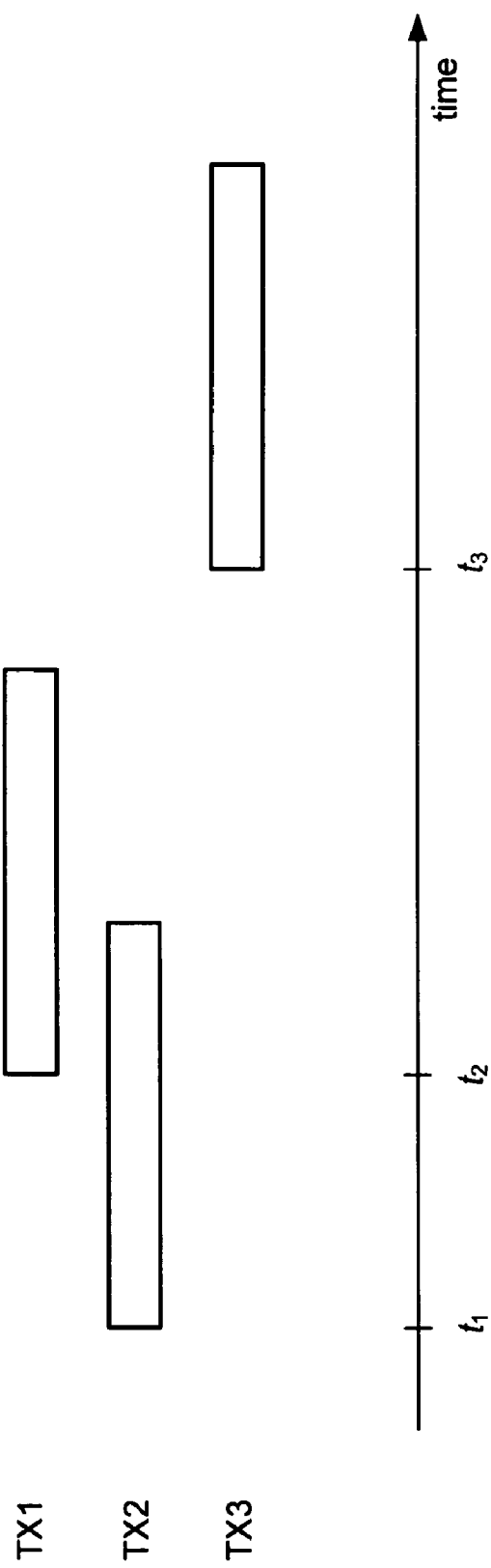
FIG. 2 is an illustration of a timeline of unit-unique messages transmitted by three different transmitter units of FIG. 1.

For example, FIG. 2 illustrates a timeline of unit-unique messages transmitted by three different transmitter units. At time $t_1$, transmitter unit TX2 begins a message transmission, and time $t_2$ transmitter unit TX1 begins a message transmission, and at time $t_3$ transmitter unit TX3 begins a transmission. In this example, it can be seen that the transmissions from TX1 and TX2 partially overlap in time. In general, transmissions from multiple transmitter units may overlap partially in time, overlap completely in time, or not overlap at all. Additionally, during a given interval of time, none, some, or all of the transmitter units may make a unit-unique message transmission.

Returning to FIG. 1, the transmitter units 102 may also be configured to transmit at a common radio frequency. Furthermore, the transmitter units may be configured to use the common spreading code at a common spreading code frequency. Of course, depending on unit to unit variations, each transmitter unit may transmit with an offset from the common radio frequency and an offset from the common spreading code frequency, for example due to oscillator inaccuracies or Doppler frequency shift. The system can accommodate these offsets, if present, as discussed further below.

The system also includes a receiver unit 104. The receiver unit is in communication with at least one of the plurality of transmitter units, for example through a wireless radio communications channel 106. The receiver unit thus receives unit-unique message transmissions from the transmitter units. The received signal parameters will not be exactly the same as the signal parameters used at the transmitter unit. For example, the reception start times (reception code phase) for unit-unique messages at the receiver unit will not be exactly the same as the transmission start time (transmission code phase) at the transmitter unit due to propagation delay between the transmitter units and the receiver unit. Furthermore, the propagation delay between different transmitter units and the receiver unit may be different due to range differences between the different transmitter units and the receiver unit. In addition, reception carrier frequencies may different from transmit carrier frequencies due to oscillator differences between the transmitter units and the receiver unit or due to Doppler effect.

The receiver unit may include means for detecting the presence of spread spectrum bursts encoded with the common spreading code, means for estimating a reception signal parameter set corresponding to each detected spread spectrum burst, and a plurality of means for independently demodulating spread spectrum bursts using the common spreading code, a single one of the plurality of means for independently demodulating assigned to each detected spread spectrum burst.

Figure 3:
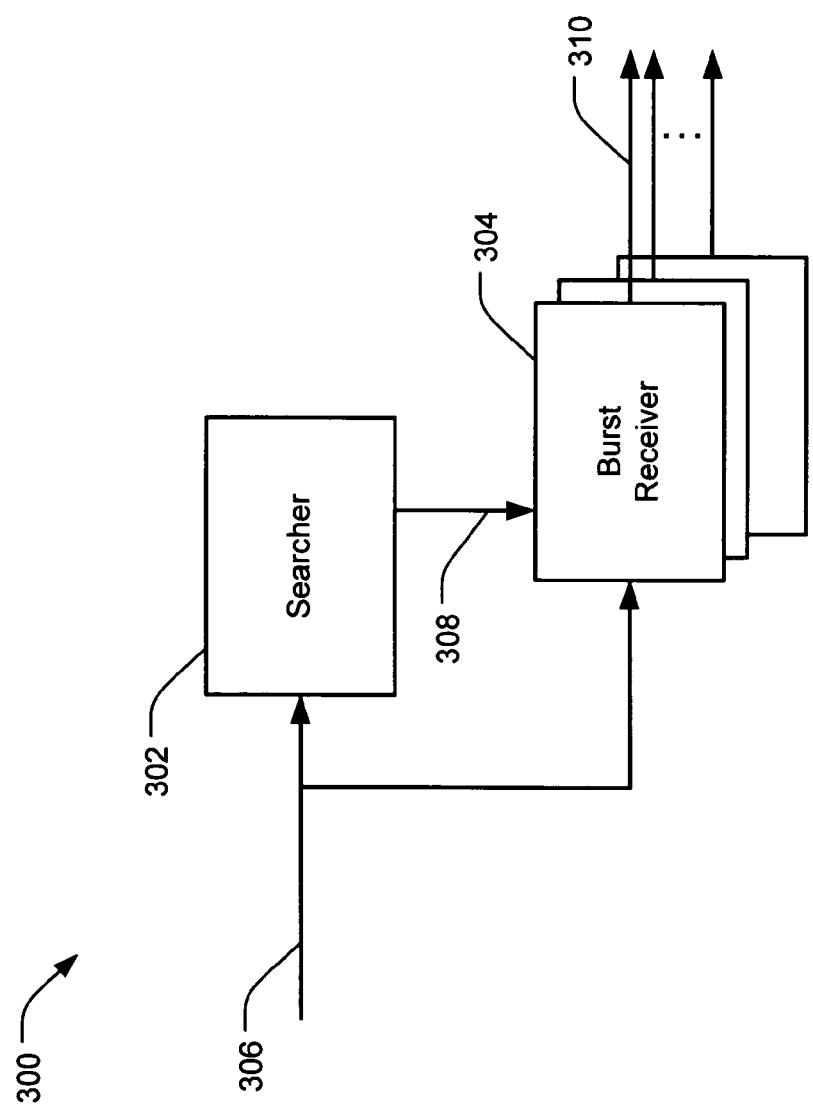
FIG. 3 is a block diagram of a receiver unit in accordance with one embodiment of the present invention.

For example, FIG. 3 provides a block diagram of a receiver unit 300 in accordance with one embodiment of the present invention. The receiver processes a received signal 306. A searcher 302 provides means for detecting the presence of spread spectrum encoded bursts and means for estimating reception signal parameters. The searcher 302 is configured to detect the presence of spread spectrum bursts encoded with the common spreading code embedded within the received signal. The searcher may be configured to accommodate spread spectrum bursts which are transmitted with a carrier frequency or code frequency slightly different than normally expected, for example due to Doppler frequency shift or clock drift. For example, the searcher may search a plurality of different reception start time hypothesis, a plurality of different carrier reception frequency hypotheses, or a plurality of different reception code frequency hypothesis. The searcher may be implemented with a sliding correlator, for example by using a finite impulse response filter with the taps set equal to the complex conjugate of the spreading code. One exemplary implementation of a searcher suitable for use in the present invention is disclosed in commonly owned co-pending U.S. patent application Ser. No. 11/351,464, entitled "Spread Spectrum Detection System and Method".

As will be appreciated by one of skill in the art, the searcher 302 is not guaranteed to detect every spread spectrum encoded bursts which may be present within the received signal 306. This is often the case for radio or wireless communications systems, which are subject to the randomness of the environment in which they are deployed. For example, fading, or long range may cause the spread spectrum encoded burst to be quite weak when it arrives at the receiver unit, causing the signal to noise ratio to be very low. Thus, although the techniques disclosed herein can improve the probability of detection, there may be situations where spread spectrum encoded bursts arriving at the receiver unit are not detected.

For each detected spread spectrum burst, the searcher forms an estimated reception signal parameter set 308 for that burst. For example, the estimated reception signal parameter set can include a reception starting time. As another example, the estimated reception signal parameters can include a reception carrier frequency. As yet another example, the estimated reception signal parameters can include a code frequency offset. The searcher then assigns a single burst receiver from a plurality of burst receivers 304 to demodulate that burst, and provides the estimated reception signal parameter set corresponding to that burst to the single burst receiver. The searcher may assign the single burst receiver by selecting the single burst receiver from a subset of the plurality of burst receivers not currently busy demodulating a detected spread spectrum burst. The selection may be performed randomly (e.g., by picking any burst receiver not busy), or sequentially (e.g., by picking the lowest numbered burst receiver not busy), or using other techniques as will occur to one of skill in the art having possession of this disclosure.

The receiver unit may also include a plurality of means for independently demodulating spread spectrum bursts using the common spreading code and estimated reception time. For example, a plurality of burst receivers 304 may provide means for independently demodulating spread spectrum bursts. The number of burst receivers is denoted by $N_{RX}$.

The burst receivers 304 are each configured to independently demodulate a single spread spectrum burst using the common spreading code and the estimated reception signal parameter set 308. Of course, there is a chance that the searcher will erroneously assign a burst receiver based on a false detection, in which case there is no unit-unique message to be detected. In such a case, the burst receiver may, upon determining no valid message is present, cease demodulating, making itself again available for assignment to a new detected burst.

Because each burst receiver 304 can demodulate a different spread spectrum burst to obtain the individual unit-unique message encoded within that burst, this is significantly different than known rake receivers, where multiple rake receiver fingers process the same burst and are subsequently combined to extract one message. Each burst receiver may thus include independent tracking loops to track initial and changing carrier frequency offset, code frequency offset, and code phase. The multiple burst receivers thus provide the ability to independently demodulate multiple overlapping spread spectrum bursts embedded within the received signal 306, for example overlapping bursts as illustrated in FIG. 2.

In accordance with one embodiment of the present invention, the plurality of burst receivers can be implemented by a single hardware or software processing unit which sequentially processes multiple overlapping transmissions. Samples of bursts to be processed are held in a memory, and processed in sequential order, providing individual message outputs 310 after completion of processing of each individual message. The number of burst receivers provided by such a single processing unit is thus determined by the processing speed. For example, if the processing unit can completely process a burst transmission in one-third the time taken to transmit the burst, the processing unit can thus implement three simultaneous burst receivers.

In accordance with an alternate embodiment of the present invention, the plurality of burst receivers can be implemented by a plurality of independent hardware units. This allows overlapping bursts to be demodulated substantially simultaneously, providing individual message outputs 310 shortly after the completion of reception of the individual message.

The number, $N_{RX}$, of burst receivers 304 (FIG. 3) can be equal to the number, $N_{TX}$, of transmitter units 102 (FIG. 1), but this is not essential. For example, $N_{RX}$, may be chosen to be less than $N_{TX}$. This is an efficient selection, for example, when the duty cycle of transmission by the transmitter units is relatively low. Under such conditions, there is a relatively low probability of overlapping transmissions. The number of simultaneous overlapping transmissions that can be accommodated by the receiver unit is related to the number of burst receivers $N_{RX}$. At a given time, the expected number of overlapping transmissions may be a relatively small number. By providing a number of burst receivers equal to the expected number of overlapping transmissions, good performance is obtained. Hence, a receiver unit with a relatively small number of burst receivers may efficiently accommodate a large network of transmitter units.

The receiver unit 300 provides an additional advantage of flexibility in the tradeoff of detection probability for false detections. Lower detection thresholds may be used in the searcher 302 to provide improved detection probability. Although this may result in a high false detection rate, the receiver unit architecture can accommodate this increased false alarm rate by including additional burst receivers 304. These additional burst receivers help to ensure that, even when some burst receivers are assigned to false detections, idle burst receivers will still be available for assignment to incoming bursts. For example, consider a system where there are never more than three overlapping bursts. Hence, a receiver unit with three burst receivers can accommodate the system. If six burst receivers are included, there are sufficient burst receivers available for a false detection rate equal to the expected message arrival rate. This may correspond to an increase in the allowable false detection rate of several orders of magnitude, thereby permitting a significantly lower detection threshold. The improved detection probability provided by the lower detection threshold can thus be used to extend the range of the system, permit shorter preambles, or reduce the power of the transmitter. Shorter preambles and reduced power can provide advantages to covert transmitters, making their detection more difficult. Shorter preambles can also increase the efficiency of the system by providing higher channel throughput and reduced interference between transmitter units.

Although the system 100 (FIG. 1) and receiver unit 300 (FIG. 3) are illustrated in block diagram form, detailed implementation of the system and receiver unit will be apparent to one of skill in the art having this disclosure. For example, the receiver unit may be implemented in an FPGA or ASIC, including either a single burst receiver or multiple burst receivers within an FPGA or ASIC device. Alternately, all or a portion of the receiver unit may be implemented in software algorithms which are executed by a general purpose processor or digital signal processor.

Figure 4:
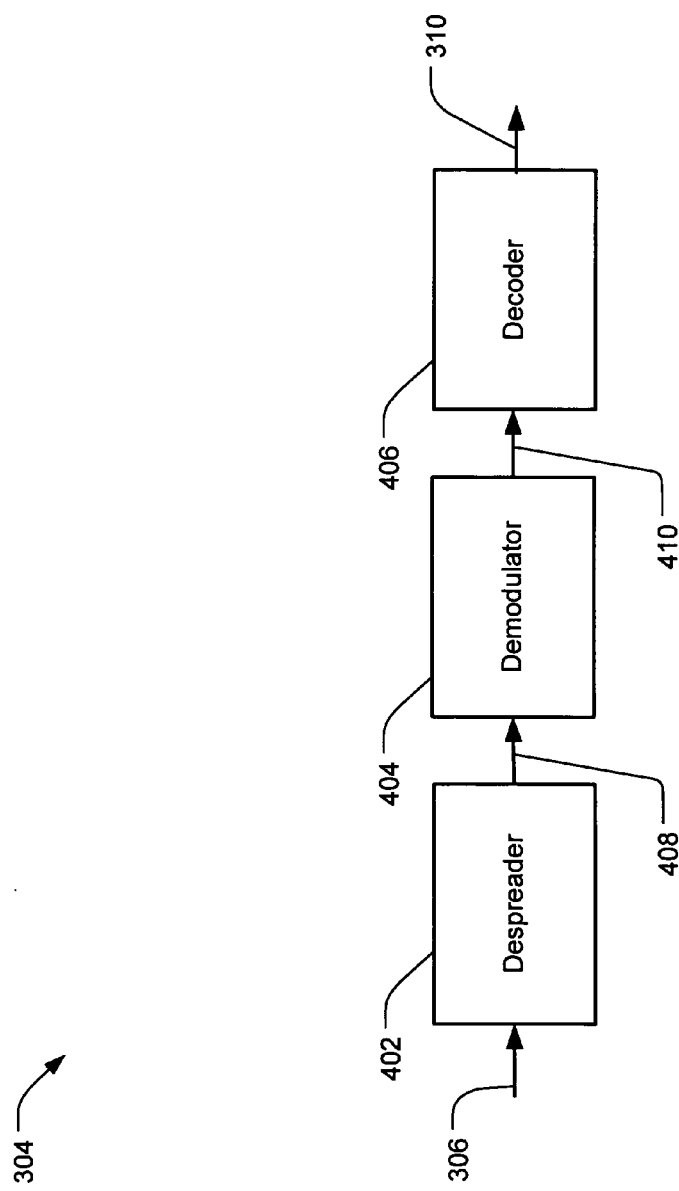
FIG. 4 is a block diagram of a burst receiver in accordance with one embodiment of the present invention.

Turning attention to the burst receiver in further detail, FIG. 4 provides a detailed block diagram of one implementation of a burst receiver 304 in accordance with an embodiment of the present invention. The burst receiver may include a despreader 402, a demodulator 404, and a decoder 406. The despreader accepts a received signal 306, which may include spread spectrum encoded bursts. The received signal is despread using the common spreading code to form a despread signal 408. For example, the despreader may perform direct sequence despreading or frequency hopping despreading. Various techniques for implementing a despreader are known in the art, and are to be considered within the scope of the embodiments of the present invention. For example, despreading may be accomplished using a matched filter or correlator.

The demodulator 404 demodulates the despread signal to extract the individual message 410. Many different modulation formats are known which are suitable for use in embodiments of the present invention, including but not limited to: binary phase shift keying, quadrature phase shift keying, offset quadrature phase shift keying, M-ary phase shift keying, quadrature amplitude modulation, and M-ary frequency shift keying, each of these modulation formats having in common the property of encoding the individual message data onto a signal for transmission. Detailed implementations of demodulators for these formats are well known in the art, and to be considered within the scope of the embodiments of the present invention.

The decoder 406 error correction decodes the individual message 410 to provide an individual message output 310. Various forward error correction schemes are known in the art, including but not limited to: convolutional coding, block coding, and turbo coding. Hence, the decoder may perform, for example, convolution decoding, Viterbi decoding, block decoding, trellis decoding, or turbo decoding, the decoding complementary to the encoding used by the transmitter unit. Each of these decoding techniques provides the common property of, under certain channel conditions, reducing the probability of error in the demodulated and decoding message data.

Figure 5:
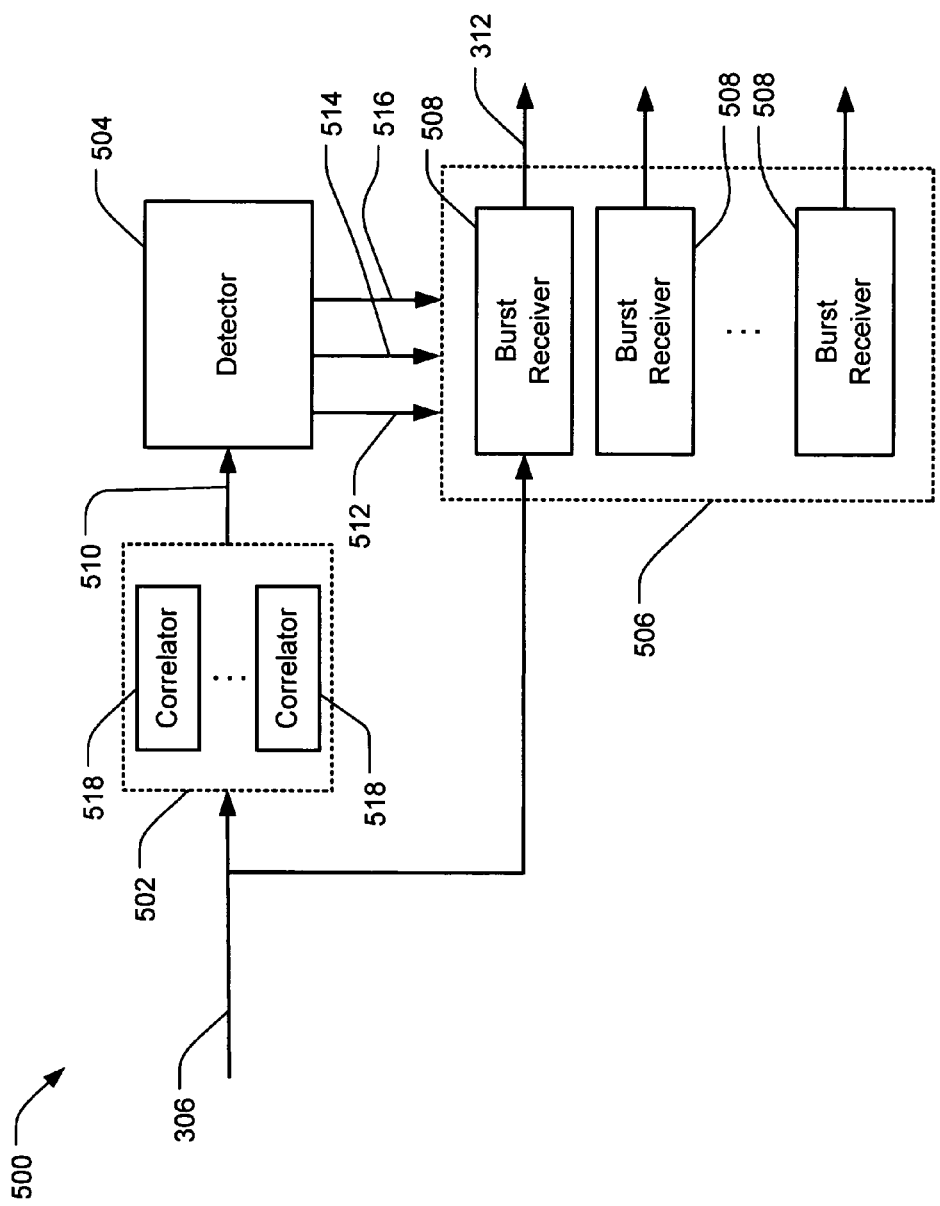
FIG. 5 is a block diagram of a receiver unit in accordance with another embodiment of the present invention.

An alternate implementation of a receiver unit is illustrated in FIG. 5 in accordance with another embodiment of the present invention. The receiver unit 500 accepts a received signal, which may contain multiple spread spectrum encoded bursts. The spread spectrum encoded bursts are encoded with a common spreading code, as discussed above. Each spread spectrum encoded burst will generally have a unique starting time, and thus have a unique code phase. The term code phase refers to the timing of the pseudonoise code. Code phase can be defined relative to various references, including for example a timing clock within the system. Alternately, various other timing references (such as an external timing source) can be used as well. Code phase is thus a function of the start time of the pseudonoise code at the transmitter, starting code phase offset in the transmitter (if the transmitter does not start at the beginning of the code, but starts at some intermediate point), propagation delay between the transmitter and system, and possibly other sources.

Alternately, spread spectrum encoded bursts having the same code phase, but different reception carrier frequencies can also be demodulated with little interference to each other if the carrier frequencies are sufficiently different. For example, reception carrier frequencies can be offset due to relative oscillator error or Doppler effects. Sufficient carrier frequency difference for relatively interference free demodulation depends on the details of the matched filters, data rate, and similar parameters as will be understood by one of skill in the art.

The receiver unit 500 may include a searcher 502 configured to correlate the received signal with the common spreading code at a plurality of code phases to produce a plurality of correlation results 510. For example, the searcher may be implemented using a sliding correlator which repeatedly correlates the received signal with the common spreading code, each correlation performed for a different code phase, as described above. As another example, the searcher may be implemented using a plurality of correlators 518, each correlator configured to correlate the received signal with the common spreading code using a different phase. As yet another example, an exemplary correlator suitable for use with embodiments of the present invention is disclosed in co-pending U.S. patent application Ser. No. 11/351,465, entitled "Correlation Apparatus and Method for Accommodating Spreading Code Frequency Offset". The correlation may be performed over a complete period of the common spreading code sequence, over a subset of the complete period, or over multiple periods.

Coupled to the searcher 502 is a detector 504, configured to determine the presence of candidate bursts based on the correlation results and form an estimated code phase corresponding to each candidate burst. For example, the detector may determine the presence of the candidate burst based on the magnitude of the correlation results. More specifically, the correlation results may be compared to a detection threshold, and detection declared when the magnitude of correlation result exceeds the threshold. The threshold may be a predetermined value, or may be based on a previous correlation result. For example, one or more previous correlation results may be used to provide an estimate of the receive noise floor, and the threshold set at a multiple of the estimate of the receive noise floor, the multiple chosen to provide a desired detection probability. As discussed above, although lower thresholds generally result in higher false detections, these false detections can be accommodated by the receiver unit 500.

When the detector 504 has determined the presence of a candidate burst, a single burst receiver 508 is assigned from the plurality of burst receivers 506 to demodulate the candidate burst. This assignment may be performed by selecting the single burst receiver from a subset of the plurality of burst receivers not currently busy demodulating a candidate burst, for example, as discussed above. Alternately, the assignment may be performed by establishing a list of reception signal parameters to be used sequentially by a processing unit that implements the plurality of burst receivers, for example, as discussed above.

The detector forms an estimate of the code phase 512 for the candidate burst, which is provided to the assigned single burst receiver. For example, code phase may be estimated by taking the code phase corresponding to the largest correlation result. As another example, the code phase may be estimated by interpolating between a plurality of the correlation results, by performing a linear interpolation. The detector may also estimate a code frequency and carrier frequency corresponding to the candidate burst, and provide the estimated code frequency 514 and estimated carrier frequency 516 to the burst receiver. The burst receiver may use the estimated code phase, code frequency and carrier frequency to reduce the time required to achieve fine synchronization of the candidate burst, in turn improving the efficiency of the system. Hence, including this estimation processing in the detector may allow the use of shorter preambles. Improved estimates may be obtained by interpolating multiple correlation results.

The burst receivers 508 are configured to independently demodulate candidate bursts using the common spreading code at the estimated code phase provided by the detector. The burst receivers may each include a despreader, demodulator, and decoder as discussed above. The burst receivers output the individual message extracted corresponding to the individual candidate burst assigned to each burst receiver.

Figure 6:
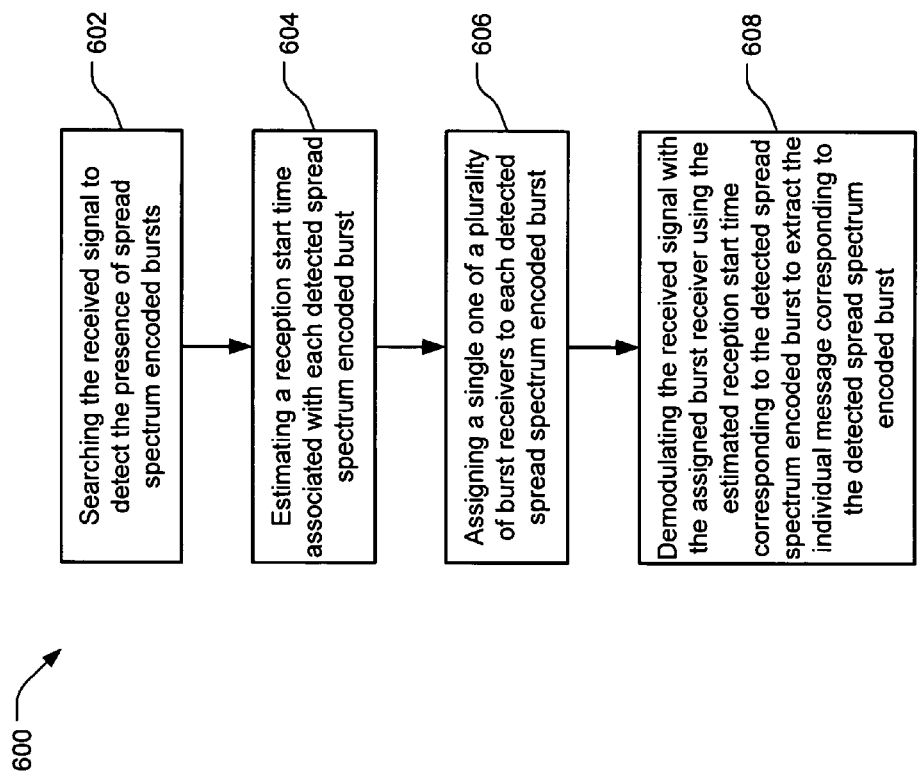
FIG. 6 is a flowchart of a method for receiving a plurality of spread spectrum encoded bursts contained within a received signal in accordance with an embodiment of the present invention.

Finally, a method 600 for receiving a plurality of spread spectrum encoded bursts contained within a received signal is provided in flow chart form in FIG. 6. The spread spectrum encoded bursts each contain an individual message and unique reception start time. The unique reception start time is a function of the individual message transmission start time and propagation delay. A first step of the method may include searching 602 the received signal to detect the presence of spread spectrum encoded bursts. For example, searching may be performed by correlating the received signal with the common spreading code at a plurality of different starting time hypotheses. Various techniques for using a correlator to search are discussed above.

Another step of the method may include estimating 604 a reception start time associated with each detected spread spectrum encoded bursts. For example, the reception start time may be estimated by finding a maximum correlation result as discussed above.

Another step of the method may include assigning 606 a single one of a plurality of burst receivers to each detected spread spectrum encoded burst. For example, the single one of the plurality of burst receivers may be randomly selected from the subset of burst receivers not currently busy demodulating a burst as discussed above.

A final step of the method may include demodulating 608 the received signal with each assigned burst receiver using the estimated reception start time corresponding to the detected spread spectrum encoded burst to extract the individual message corresponding to the detected spread spectrum encoded burst. Demodulating the received signal may include despreading and error correction decoding as discussed above.

In accordance with another embodiment of the present invention, the method may also include demodulating the received signal with a first assigned burst receiver assigned to a first detected spread spectrum encoded burst and a second assigned burst receiver assigned to a second detected spread spectrum encoded burst. The first and second burst receivers may perform demodulating during a partially overlapping time interval. For example, referring to FIG. 2, the burst transmitted by transmitter unit TX2 may be assigned to the first burst receiver for demodulation, and the burst transmitted by transmitter unit TX1 may be assigned to the second burst receiver for demodulation.

The individual message transmissions, although transmitted on a common carrier frequency and using the common spreading code with a common spreading code frequency, may be received with slightly different carrier frequencies or reception code frequencies, for example due to Doppler or oscillator errors as discussed above. Hence, in accordance with another embodiment of the present invention, the method may include estimating a reception carrier frequency associated with each detected spread spectrum encoded burst, and compensating for the estimated reception carrier frequency while demodulating the spread spectrum encoded burst. The method may also include, in accordance with a further embodiment of the present invention, estimating a reception code frequency associated with each detected spread spectrum encoded burst, and compensating for the estimated reception code frequency while demodulating the spread spectrum encoded burst. Estimated reception code frequency and reception carrier frequency may also be further refined by interpolation as discussed above.

Summarizing, and reiterating to some extent, a technique for receiving spread spectrum encoded burst using a common spreading code has been developed. The technique includes searching for spread spectrum encoded bursts within a received signal, where individual spread spectrum encoded bursts can each have an individual message and unique reception start time. For each detected spread spectrum encoded burst, a single one of a plurality of burst receivers are assigned to independently demodulate the spread spectrum encoded burst. The technique thus accommodates independent demodulation of multiple overlapping spread spectrum bursts. Potential benefits of the technique include faster message output (compared to a serial demodulation approach), greater flexibility in setting detection threshold (e.g., lower thresholds to improve range), and the use of shorter synchronization preambles (e.g., providing increased communication efficiency).

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. An apparatus for receiving multiple spread spectrum bursts encoded with a common spreading code, each spread spectrum burst having an individual message and a unique reception signal parameter set, the apparatus comprising:
    a searcher configured to detect the presence of spread spectrum bursts encoded with the common spreading code and form a plurality of estimated reception signal parameter sets, each estimated signal parameter set corresponding to a detected spread spectrum burst; and
    a plurality of burst receivers coupled to the searcher, each burst receiver configured to independently demodulate a single spread spectrum burst using the common spreading code and the estimated reception signal parameter set corresponding to the single spread spectrum burst to extract the individual message corresponding to the single spread spectrum burst, wherein the searcher is further configured to assign a single burst receiver selected from the plurality of burst receivers to each detected spread spectrum burst.

2. The apparatus of claim 1 wherein the estimated signal parameter set comprises a reception start time.

3. The apparatus of claim 1 wherein the searcher is further configured to assign a single burst receiver by selecting a single burst receiver from a subset of the plurality of burst receivers not currently busy demodulating a detected spread spectrum burst.

4. The apparatus of claim 1 wherein the searcher is further configured to search a plurality of different reception start time hypotheses.

5. The apparatus of claim 1 wherein the searcher is further configured to search a plurality of different reception carrier frequency hypotheses.

6. The apparatus of claim 1 wherein the searcher is further configured to search a plurality of different reception code frequency hypotheses.

7. The apparatus of claim 1 wherein the plurality of burst receivers is further configured to independently demodulate multiple overlapping spread spectrum bursts.

8. The apparatus of claim 1 wherein the plurality of burst receivers is further configured to demodulate multiple overlapping spread spectrum bursts substantially simultaneously.

9. The apparatus of claim 1 wherein each burst receiver comprises:
   a despreader configured to despread the detected spread spectrum burst using the common spreading code to form a despread signal; and
   a demodulator coupled to the despreader and configured to demodulate the individual message from the despread signal.

10. The apparatus of claim 9, wherein the despreader is further configured to despread a direct sequence spread spectrum signal.

11. The apparatus of claim 9, wherein the despreader is further configured to despread a frequency hopped spread spectrum signal.

12. The apparatus of claim 9, wherein the demodulator is further configured to perform a demodulation selected from the group consisting of binary phase shift keying demodulation, quadrature phase shift keying demodulation, offset quadrature phase shift keying demodulation, M-ary phase shift keying demodulation, quadrature amplitude demodulation, and M-ary frequency shift keying demodulation.

13. The apparatus of claim 1 wherein each burst receiver further comprises a decoder configured to perform error correction decoding on the individual message.

14. The apparatus of claim 13 wherein the decoder is further configured to perform decoding selected from the group consisting of convolutional decoding, Viterbi decoding, block decoding, trellis decoding, and turbo decoding.

15. An apparatus for receiving multiple spread spectrum encoded bursts encoded with a common spreading code and contained within a received signal, each of the plurality of spread spectrum encoded bursts having an individual message and unique code phase, the apparatus comprising:
   a searcher configured to correlate the received signal with the common spreading code at a plurality of code phases to produce a plurality of correlation results;
   a detector coupled to the searcher and configured to determine the presence of candidate bursts based on the correlation results and form an estimated code phase corresponding each candidate burst; and
   a plurality of burst receivers coupled to the detector, each burst receiver configured to independently demodulate a candidate burst using the common spreading code at an estimated code phase assigned by the detector, wherein the detector is further configured to assign a single burst receiver selected from the plurality of burst receivers to each candidate burst.

16. The apparatus of claim 15 wherein the searcher comprises a plurality of correlators, each correlator configured to correlate the received signal with the common spreading code using a different code phase.

17. The apparatus of claim 15 wherein the searcher comprises a correlator configured to repeatedly correlate the received signal with the common spreading code, each correlation performed at a different code phase.

18. The apparatus of claim 15 wherein the searcher is further configured to correlate the received signal over a complete period of the common spreading code.

19. The apparatus of claim 15 wherein the searcher is further configured to correlate the received signal over a subset of a complete period the common spreading code.

20. The apparatus of claim 15 wherein the searcher is further configured to correlate the received signal over multiple repeats of the common spreading code.

21. The apparatus of claim 15 wherein the detector is further configured to determine the presence of the candidate burst based on a magnitude of each correlation result.

22. The apparatus of claim 15 wherein the detector is further configured to determine the presence of the candidate burst based on a magnitude of each correlation result compared to a threshold.

23. The apparatus of claim 22 wherein the threshold is a predetermined value.

24. The apparatus of claim 22 wherein the threshold is based on a previous correlation result.

25. The apparatus of claim 15 wherein the detector is further configured to form the estimated code phase by interpolating a plurality of correlation results.

26. The apparatus of claim 15 wherein the detector is further configured to select the single burst receiver from the plurality of burst receivers by selecting the single burst receiver from a subset of the plurality of burst receivers not currently busy demodulating a candidate burst.

27. The apparatus of claim 26 wherein the detector is further configured to select the single burst receiver by randomly picking one burst receiver from the subset of the plurality of burst receivers not currently busy demodulating a candidate burst.

28. The apparatus of claim 26 wherein the detector is further configured to select a single burst receiver by picking a first available burst receiver from the subset of the plurality of burst receivers not currently busy demodulating a candidate burst.

29. The apparatus of claim 15 wherein the detector is further configured to estimate a code frequency corresponding to each candidate burst.

30. The apparatus of claim 15 wherein the detector is further configured to form an estimated carrier frequency corresponding to each candidate burst.

31. An apparatus for receiving multiple spread spectrum bursts encoded with a common spreading code, each spread spectrum burst having an individual message and a unique reception start time, the apparatus comprising:
   means for detecting the presence of spread spectrum bursts encoded with the common spreading code;
   means for estimating a reception signal parameter set corresponding to each detected spread spectrum burst, the means for estimating coupled to the means for detecting; and
   plural means for independently demodulating a spread spectrum burst using the common spreading code and an estimated reception signal parameter set to extract an individual message corresponding to the single spread spectrum burst, wherein a single one of the means for independently demodulating a spread spectrum burst is assigned to each detected spread spectrum burst, the plural means for independently demodulating coupled to the means for estimating.

32. A system of communication using a common spreading code comprising:

a plurality of $N_{TX}$ transmitter units, each transmitter unit configured to independently transmit a unit-unique message spread spectrum encoded with the common spreading code; and a receiver unit, in communication with at least one of the plurality of transmitter units through a wireless communication path, comprising:

a plurality of $N_{RX}$ burst receivers each configured to independently demodulate a different received spread spectrum transmission using the common spreading code with an estimated code phase to extract a unit-unique message corresponding to the different received spread spectrum transmission, and a searcher, coupled to the plurality of burst receivers and configured to detect the presence of spread spectrum encoded transmissions from the plurality of transmitter units and form the estimated code phase corresponding to each detected spread spectrum encoded transmission and assign a single one of the plurality of burst receivers to demodulate each detected spread spectrum encoded transmission using the estimated code phase.

33. The system of claim 32, wherein the searcher is further configured to assign a single one of the plurality of burst receivers by selecting a single one of a subset of the plurality of burst receivers not currently demodulating a received spread spectrum transmission.

34. The system of claim 32, wherein $N_{RX}$ is equal to $N_{TX}$.

35. The system of claim 32, wherein $N_{RX}$ is less than $N_{TX}$.

36. The system of claim 32, wherein each transmitter unit is configured to independently transmit at a common radio frequency.

37. The system of claim 32, wherein the searcher is further configured to detect the presence of spread spectrum encoded transmissions having a carrier frequency different from an expected carrier frequency.

38. The system of claim 32, wherein the searcher is further configured to detect the presence of spread spectrum encoded transmissions having code frequency different from an expected code frequency.

39. A method for receiving a plurality of spread spectrum encoded bursts encoded with a common spreading code, each spread spectrum encoded burst having an individual message and unique reception start time, the plurality of spread spectrum encoded bursts contained within a received signal, the method comprising:

searching the received signal to detect the presence of spread spectrum encoded bursts;

estimating a reception signal parameter set associated with each detected spread spectrum encoded burst;

assigning a single one of a plurality of burst receivers to each detected spread spectrum encoded burst; and demodulating the received signal with each assigned burst receiver using the estimated reception signal parameter set corresponding to the detected spread spectrum encoded burst to extract the individual message corresponding to the detected spread spectrum encoded burst.

40. The method of claim 39, further comprising:

demodulating the received signal with a first assigned burst receiver assigned to a first detected spread spectrum encoded burst; and demodulating the received signal with a second assigned burst receiver assigned to a second detected spread spectrum encoded burst.

41. The method of claim 40 wherein demodulating the received signal with the first assigned burst receiver and demodulating the received signal with the second assigned burst receiver are performed during partially overlapping time intervals.

42. The method of claim 39, wherein demodulating the received signal further comprises despreading the received signal.

43. The method of claim 39, wherein demodulating the received signal further comprises error correction decoding the received signal.

44. The method of claim 39, wherein searching the received signal further comprises correlating the received signal with the common spreading code at a plurality of different start time hypotheses.

45. The method of claim 39, further comprising estimating a reception code frequency associated with each detected spread spectrum encoded burst, wherein demodulating the received signal further comprises compensating for the estimated reception code frequency.

46. The method of claim 39, further comprising estimating a reception carrier frequency associated with each detected spread spectrum encoded burst, wherein demodulating the received signal further comprises compensating for the estimated reception carrier frequency.

* * * * *